Dec. 2, 1969  S. R. FARIS ET AL  3,481,206
ACCELERATION RESPONSIVE MEASURING SYSTEMS
Filed Oct. 22, 1965  2 Sheets-Sheet 1

SAM R. FARIS
HERMAN C. CUSTARD
INVENTORS

BY
ATTORNEY

SAM R. FARIS
HERMAN C. CUSTARD
INVENTORS

BY *William D. Jackson*
ATTORNEY

United States Patent Office 3,481,206
Patented Dec. 2, 1969

3,481,206
ACCELERATION RESPONSIVE MEASURING
SYSTEMS
Sam R. Faris and Herman C. Custard, Dallas, Tex.,
assignors to Mobil Oil Corporation, a corporation of
New York
Filed Oct. 22, 1965, Ser. No. 501,397
Int. Cl. G01p *15/00;* G01m *1/12*
U.S. Cl. 73—516                                     20 Claims

ABSTRACT OF THE DISCLOSURE

This specification describes an acceleration responsive measuring system of the type employing one or more concentration cells divided into first and second compartments by a semipermeable membrane. Each cell compartment contains an electrolytic solution of a different concentration and density than that contained in the other compartment. Electrodes are located in each compartment. The electrode in the second compartment is reversible with respect to an ion in each of the electrolytic solutions and is located within a concentrated diffusion zone adjacent the membrane within the second compartment. By so locating this electrode the deviation in cell potential produced by an imposed acceleration field is enhanced.

---

This invention relates to acceleration measurements and more particularly to new and improved acceleration responsive measuring systems which utilize the effect of acceleration changes upon the electrical potential produced by electrochemical concentration cells.

An electrochemical concentration cell with transference comprising two electrolytic solutions of different concentrations separated by an ion-selective membrane and with an electrode in each solution exhibits a definite electromotive force which depends upon, among other things, the ratio of the activity of the ions in the two solutions and the nature of the ion-selective membrane. The electrical potential of the cell, which tends to decay with time, may be measured by measuring the potential difference between the two electrodes immersed in the electrolytic solutions. It has long been known that the difference in potential between the electrodes in the concentration cell may be varied by varying the acceleration exerted upon the system. For example, a work published in 1926 (Brauner, L.: Uber das geo-elektrische Phanomen. Kolloidchemie, Beihefte, 23, 143–152) reported results of tests carried out with the membrane of a concentration cell oriented at different attitudes in the earth's gravitational field. With the cell oriented so that the membrane was in a plane parallel with the earth's gravitational field, the cell potential differed by three to five millivolts from the cell potential measured when the membrane was oriented in a plane normal to the gravitational field. This phenomenon has been termed the "geoelectric effect."

In U.S. patent application Ser. No. 501,626 by Herman C. Custard filed of even date herewith there is disclosed an acceleration responsive measuring system in which the geoelectric effect exhibited by electrochemical concentration cells is utilized to measure acceleration changes such as fluctuations in the earth's gravitational field. The system disclosed therein comprises one or more electrochemical concentration cells each of which includes an ion-selective membrane separating the concentrated electrolytic solution from the dilute electrolytic solution and an electrode immersed in each of the solutions. This system may be utilized in accordance with the teachings of application Ser. No. 501,626 to measure an unknown gravity condition by determining the deviation of the cell potential in response thereto from the cell potential as it would exist under a standard gravity condition.

The present invention presents an improved acceleration responsive measuring system of the type disclosed in the aforementioned patent application and which involves an electrode positioned in the less concentrated solution at an optimum location such that certain new and unexpected results are obtained. More particularly, it has been discovered that the geoelectric effect is due to or accompanied by the formation of a stable diffusion layer of concentrated electrolytic solution adjacent the cell membrane in the dilute solution and that by positioning an electrode within this concentrated diffusion zone, rather than at some remote location within the dilute solution, it is possible to increase the magnitude of the geoelectric effect for a cell with an ion-selective membrane and to obtain a geoelectric effect for a cell having an inert membrane which is not ion-selective.

For a better understanding of the instant invention, reference may be had to the following detailed description taken in conjunction with the accompanying drawings in which.

Figure 1:
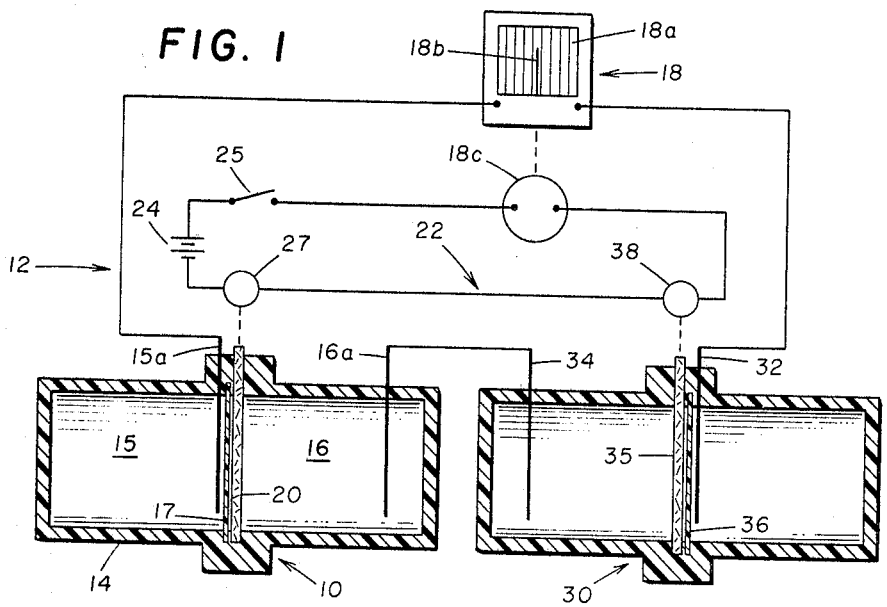
FIGURE 1 is an illustration partly in section of a gravity responsive measuring system embodying the present invention.

With reference to FIGURE 1, there is shown an acceleration responsive measuring system comprising a concentration cell 10 connected to a suitable measuring circuit 12. The cell 10 comprises a cell vessel 14 which is divided into an anode compartment 15 and a cathode compartment 16 by a semipermeable membrane 17. The cell compartments contain electrolytic solutions of different concentrations and densities, the solution in the anode compartment having a lower concentration, and normally a lower density, than the solution in the cathode compartment. An anode 15a and cathode 16a which are reversible to the anions in the electrolytic solutions are connected by means of the measuring circuit to a suitable potentiometric measuring and recording device 18. The anode is positioned in accordance with the instant invention at an optimum location adjacent the membrane 17 as will be described in more detail hereinafter. The recorder may be a strip-chart servo-balanced potentiometric recording instrument in which a drum-mounted chart 18a is moved relative to a recording stylus 18b by means of a motor 18c.

As explained in greater detail in the aforementioned application Ser. No. 501,626, the system of FIGURE 1 is provided with restrictive means by which the decay of the cell potential is abated when the system is not being used to obtain gravity or other acceleration measurements. The restrictive means is operative in a first mode for restricting diffusion of electrolyte and solvent through the membrane and operative in a second mode for admitting such diffusion. As shown in FIGURE 1, this restrictive means comprises an impermeable barrier 20 which is slidably positioned in compartment 16 adjacent the membrane. With the barrier in the closed position, it functions to restrict, i.e., substantially impede and preferably prevent, diffusion of electrolyte and solvent from one compartment to the other. Thus, there will be no decay in cell potential when the barrier is in the closed position. When it is desired to make a measurement with the disclosed system, the barrier is moved to an open position which admits of transference of ions and solvent between the two compartments. This is accomplished by withdrawing the barrier from compartment 16.

More particularly, and with reference to FIGURE 1, the gravity responsive measuring system shown therein includes an operating circuit 22 which comprises a power source such as a battery 24, a switch 25, a barrier operating solenoid 27, and the aforementioned drum motor 18c. When switch 25 is open, the barrier operating solenoid is de-energized and the barrier is in the closed position shown. To make a gravity measurement, the cell is oriented so that the membrane 17 lies in a plane having a component normal to the force of gravity, and the switch 25 is closed, thus energizing solenoid 27 which functions to withdraw barrier 20 from compartment 16 to an open position. The switch is maintained in the closed position for a period sufficient to obtain the desired potential measurements in order to determine the deviation in cell potential in response to the unknown gravity condition from the cell potential as would exist under a known standard gravity condition. Thereafter, the switch is opened and the solenoid is de-energized, returning the restrictive barrier to the closed position shown. While in the embodiment illustrated the restrictive means takes the form of a slidable barrier, it will be recognized that other suitable means may be used. For example, the barrier may take the form of a louvered shutter in which case the louvers would be closed with switch 25 open and opened with switch 25 closed.

The force responsive measuring system illustrated in FIGURE 1 also includes modulating means for modifying the readout of the potential measuring means to compensate for the decay of the cell potential from the potential from the potential existing initially or at some other reference time. As shown in FIGURE 1, this modulating means takes the form of a secondary concentration cell 30, the potential of which decays at the same rate as the potential of the primary cell utilized to take the gravity measurements. The secondary cell 30 is connected in the measuring circuit 12 such that its potential is opposite in polarity to the potential produced by the primary cell. That is, the anode 32 and the cathode 34 of the secondary cell are connected, respectively, to the anode 15a and cathode 16a of the primary cell. The secondary cell 30 also includes a restrictive barrier 35 positioned adjacent the cell membrane 36. Barrier 35 is controlled by a solenoid 38 in operating circuit 12 similarly as is the barrier in the primary cell. That is, upon closure of switch 25, the solenoids 27 and 38 act to move conjointly their respective barriers to their open positions. During the operation of the system to make gravity measurements, the secondary cell is maintained under a standard gravity condition, e.g., with its plane parallel to the gravitational field, so that the potential sensed by the measuring means, and therefore the readout produced thereby, is directly representative of the deviation of the cell potential in response to the measured gravity condition from the cell potential as it would exist under the standard gravity condition at the same magnitude of time.

The secondary cell may be of any type that produces a potential which decays at the same rate as the potential produced by the primary cell. However, it usually will be most advantageous to utilize a secondary cell which is identical in its functional components, i.e., those cell constituents which affect the potential decay such as the membrane, electrodes, and electrolytic solutions, and this arrangement is preferred. The primary and secondary cells also should be maintained at the same temperature since the potential produced by such concentration cells is a direct function of temperature. For a better understanding of this feature of the gravity responsive measuring system as well as the aforementioned restrictive means, reference is made to the aforementioned application of Herman C. Custard.

The system illustrated in FIGURE 1 comprises only one primary and one secondary cell. However, it usually will be preferred to provide a system comprising a bank of primary cells and a bank of secondary cells, the cells of each of the respective banks being connected in series such that their potentials are all of the same polarity. In this manner, the deviation in potential in response to a relative gravity change is increased. That is, the potential sensed by the potential measuring means is equal to the total cumulative potential deviation produced by the plurality of primary cells.

Figure 2:
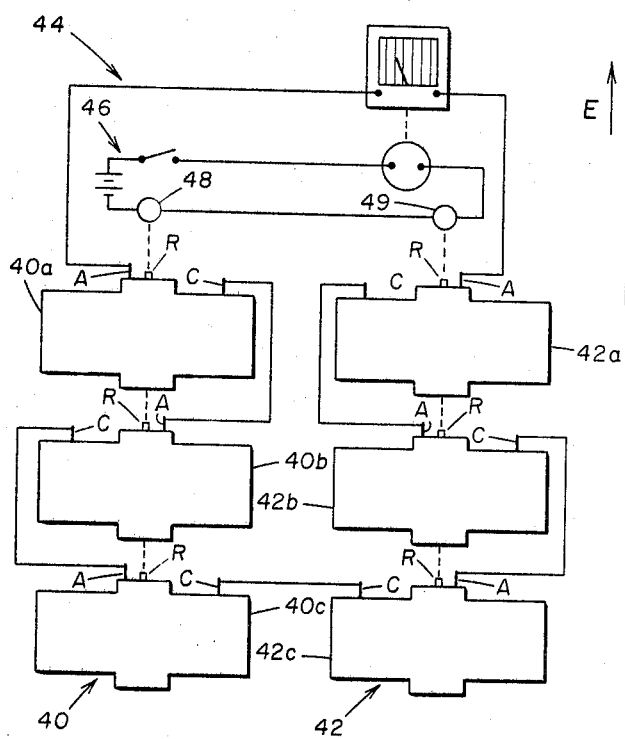
FIGURE 2 is an illustration showing a gravity responsive measuring system comprising a plurality of primary and secondary cells.

This embodiment utilizing a plurality of primary and secondary cells is illustrated in FIGURE 2. More particularly, and with reference to FIGURE 2, there is shown a primary cell bank 40 and a secondary cell bank 42. Each of the primary and secondary banks comprises, respectively, a plurality of concenttration cells 40a, 40b, and 40c, and 42a, 42b, and 42c connected in series as shown. Each of these cells has an anode A positioned in accordance with the present invention, a cathode C, and a restrictive means R such as the removable barrier illustrated in FIGURE 1. As is apparent from an examination of FIGURE 2, the potential produced by each bank will be equal to the cumulative total potential produced by its respective cells and the potential produced by the secondary bank will be opposite in polarity to the potential produced by the primary bank. The anode of cell 40a and the anode of cell 42a are connected in a measuring circuit 44 which may be identical to the circuit 12 of FIGURE 1. The system also includes an operating circuit 46 which may be identical to circuit 22 of FIGURE 1 and which includes operating solenoids 48 and 49. The barrier means in the respective cells in the primary and secondary bank are operatively connected for conjoint operation by means of their operating solenoids. For a more detailed description of a system having a pluraliy of primary and secondary cells, reference is made to the aforementioned application Ser. No. 501,626.

As noted previously, the geoelectric effect is accompanied by the formation of a stable diffusion layer adjacent the membrane. This layer, which may be the primary causative factor in the geoelectric effect, is formed adjacent the side of the membrane in contact with the relatively dilute solution, normally also the less dense solution. In accordance with the present invention, an increased geoelectric effect is achieved by locating the electrode in the less concentrated solution within this diffusion layer. In order to illustrate the results attained by so locating this electrode, normally an anode, within the cell and to enable those skilled in the art to understand better the invention, reference now will be made to certain experimental tests carried out in a study of the geoelectric effect. The concentration cells used in this investigation were of the type Ag, AgCl, electrode, 0.001 N NaCl; membrane; 0.1 N NaCl, AgCl, Ag, electrode.

Figure 3:
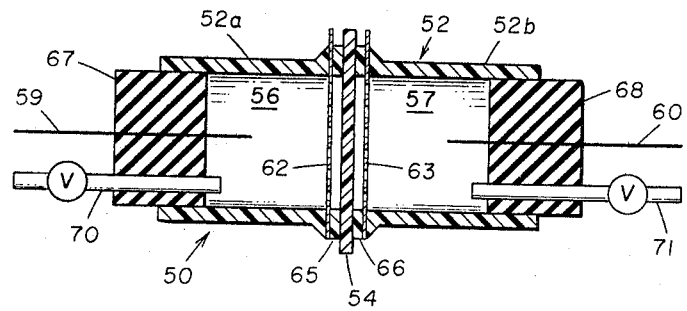
FIGURE 3 is an illustration partly in section showing a concentration cell assembly utilized in carrying out experimental tests regarding the instant invention.

In FIGURE 3 there is shown a concentration cell assembly typical of those used in the experimental work. More particularly, and with reference to FIGURE 3, there is shown a concentration cell 50 comprising a cell vessel 52, a membrane 54 dividing the cell vessel into an anode compartment 56 and a cathode compartment 57, remote electrodes 59 and 60, and proximate electrodes 62 and 63 which are in the form of perforated discs. The cell vessel is formed of two cylindrical glass joints 52a and 52b which are clamped together at their flared ends by a siutable clamping means (not shown). The membrane is held in place between the flared ends of the joints 52a and 52b by two Teflon gaskets 65 and 66. The gaskets 65 and 66 also serve to space the perforated disc electrodes at the desired distances from the membrane.

The cell vessel is closed at its outer ends by means of rubber stoppers 67 and 68 through which extend the remote electrodes 59 and 60 and valved conduits 70 and 71 for use in filling the cell with solution.

The several electrodes in the cell are adapted to be connected to a suitable measuring circuit (not shown) which includes recording means for measuring and recording as a function of time the potential across the two sets of electrodes. The recording means used in the tests was of the potentiometric type in order to avoid drawing current from the concentration cells.

The silver, silver chloride electrodes used in these tests were constructed of reagent grade silver. The electrodes were prepared by cleaning the silver wires and discs and then making them the anode in an electrolysis cell containing an aqueous solution of 0.1 normal hydrogen chloride as the electrolyte and platinum gauze as the cathode. The electrolyses were performed at an anodic current density ranging from about five to fifteen milliamps per square centimeter. The silver, silver chloride electrode prepared in this manner differed in potential by not more than about five millivolts in an aqueous solution 0.001 normal sodium chloride at 25° C.

A cationic ion-selective membrane and an inert membrane were used in carrying out the test described below. The cationic ion-selective membrane used was a sulfonated polystyrene supported on Dynel fabric. This membrane was 0.7 millimeter thick and had an exchange capacity of approximately one milliequivalent per gram and a conductance of approximately 75 millimhos per square centimeter. The inert membrane used was a conventional dialysis cellophane membrane having a thickness of about 0.2 millimeter.

The sodium chloride solutions used in these experiments ance values in the range of about $1.1 \times 10^6$ to $1.9 \times 10^6$ ohm-centimeters and an average surface tension of about 71 dynes per centimeter.

In carrying out the tests, the cathode and anode compartments of the cell were filled with 0.1 normal sodium chloride solution and 0.001 normal sodium chloride solution, respectively. The 0.1 normal sodium chloride solution had a density of about 1.0008 grams per cubic centimeter and the 0.001 normal sodium chloride solution had a density of about 0.9968 gram per cubic centimeter at 25° C. During the tests the concentration cell was handled in such a manner that the 0.1 normal solution in the cathode compartment was prevented from being positioned above the dilute solution in the anode compartment.

In one set of experimental tests run, a cationic ion-selective membrane was used in the cell and the perforated disc electrodes were spaced at various distances from the membrane. In each case the remote electrodes were maintained at a distance of 25 millimeters from the membrane. For each of these several different spacings of the disc electrodes, the geoelectric effect of the cell was observed by measuring the potential difference between the disc electrodes and also the potential difference between the remote electrodes. In each test, the concentration cell was maintained in a static condition and oriented at an attitude such that the membrane plane was vertical, i.e., parallel to the gravitational field, and thereafter oriented at an attitude such that the membrane plane was horizontal, i.e., normal to the gravitational field. The membrane was maintained in the vertical position in each case for a period of about 20 minutes or longer until a cell potential exhibiting a relatively stable decay rate was established. At this point the cell was turned so that the membrane was in the horizontal position. After a period of about 20 minutes or longer, the cell was returned to its original position with the membrane in the vertical plane.

Figure 4:
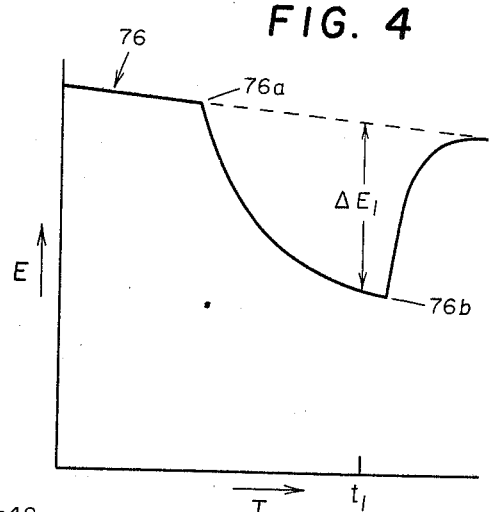
FIGURE 4 is a graph illustrating the geoelectric effect as it appears in the potential deviation of a concentration cell.

In each test the cell potential obtained by measuring the potential difference across either the remote set of electrodes or the proximate set of electrodes exhibited a rapid decrease when the membrane was placed in the horizontal position and then an increase when the membrane was returned to the vertical position. This is shown graphically in FIGURE 4 in which curve 76 is an exemplary plot of cell potential, E, on the ordinate versus time, T, on the abscissa. The first portion of curve 76 shows the cell potential with the membrane in a vertical plane. At point 76a of the curve, the cell was turned to a position with the membrane in a horizontal plane and as shown the potential decreased at a relatively rapid rate and then more gradually. As shown in FIGURE 4, at a time $t_1$ after the membrane had been turned to the horizontal position, the cell potential had decreased by an amount $\Delta E_1$ from the extrapolated value at $t_1$ of the cell potential with the membrane in the vertical position. At point 76b the cell was returned to its initial position and the cell potential increased rapidly to a value on the order of that expected had the cell remained undisturbed with its membrane in the vertical position.

For each test run the potential versus time curve was similar in nature to that shown in FIGURE 4. However, the deviation in potential as measured across the proximate electrodes typically was greater than the deviation in potential as measured across the remote electrodes under similar conditions. That is, at a common time $t_1$ after the membrane had been turned to the horizontal, the value of $\Delta E_1$ (FIGURE 4) as measured across the proximate electrodes was greater than the value of $\Delta E_1$ as measured across the remote electrodes.

Figure 5:
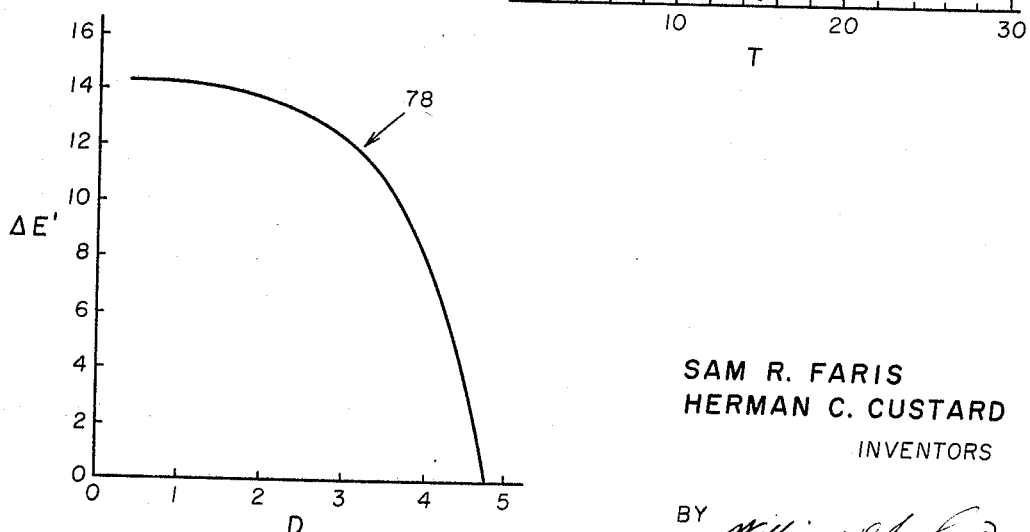
FIGURE 5 is a graph illustrating the enhanced geoelectric effect obtained by positioning an electrode within the concentrated diffusion zone of a cell having a cationic ion-selective membrane.

The results of the tests carried out with various spacings of the proximate electrodes are illustrated in FIGURE 5 which is a plot of the distance, D, in millimeters of the proximate electrodes from the adjacent membrane surface versus the difference in potential deviation, $\Delta E'$, in millivolts as defined by the equation:

$$\Delta E' = \Delta E_p - E_r \qquad (1)$$

wherein:

$\Delta E_p$ is the deviation in potential observed across the proximate electrodes, and $\Delta E_r$ is the deviation in potential observed across the remote electrodes.

In each case the deviation in potential used was that observed at a time of about 20 minutes after the membrane was turned to the horizontal position.

As is apparent from an examination of FIGURE 5, at proximate electrode spacings of less than about five millimeters from the membrane an enhanced geoelectric effect was obtained and the geoelectric effect was increased as the proximate electrodes were moved closer to the surfaces of the membrane. At proximate electrode spacings of more than about five millimeters from the membrane, no enhanced geoelectric effect was observed. That is, the deviation in potential measured across the proximate electrodes so spaced was substantially the same as the deviation in potential measured across the remote electrodes.

As noted previously, this increased geoelectric effect is observed because of the location of the electrode in the dilute electrolytic solution within the diffusion layer of concentrated electrolyte formed adjacent the surface of the membrane in contact with the dilute solution. That is, in order to obtain this increased effect, it is only necessary that the electrode in the dilute solution be placed adjacent the membrane. The electrode in the concentrated solution may be positioned adjacent the membrane as in the above-described tests, or it may be randomly located at some remote location with respect to the membrane. This is demonstrated by tests which were carried out in a cell in which the potential measurements were taken across a proximate and a remote electrode which were both positioned on the same side of the membrane in the dilute solution. That is, the electrodes were positioned similarly as the electrodes 59 and 62 shown in FIGURE 3. In these tests, the membrane was turned from the vertical to the horizontal with the dilute solution above the membrane as in the previously described tests. Immediately upon orienting the cell with the membrane in a horizontal plane, the proximate electrode became more negative with respect to the remote electrode and the potential across the electrodes increased rapidly and then after a few minutes became relatively stable. Upon returning the membrane to the horizontal position, the potential decreased rapidly to about its original value. This increase in potential typically was on the same order of the $\Delta E'$ (FIGURE 5) for similar electrode spacings.

It is not known with certainty why the concentrated solution diffuses through the membrane with its density preserved to form the diffusion layer. It appears likely that the ions in the concentrated solution come through the membrane bringing their solvation shells with them. In any event, the diffusion layer builds up rapidly to its maximum thickness and concentration within about 20 to 30 minutes after orienting the cell with its membrane in a horizontal plane and then becomes relatively stable for a period of about eight hours, after which it decreases until it has all but disappeared within about 24 hours. During this stable period, the rate of diffusion through the membrane is substantially the same as the rate of diffusion from the concentrated diffusion zone into the bulk dilute solution. By the term "concentrated diffusion zone," as used herein and in the appended claims, is meant the zone of the cell occupied by the diffusion layer adjacent the horizontal membrane during this period, i.e., the zone of maximum thickness within which a $\Delta E'$ as defined by Equation 1 may be observed.

In accordance with the present invention, the electrode in the dilute solution is spaced from the membrane at any location within the concentrated diffusion zone. From an examination of FIGURE 5 it can be seen that the concentrated diffusion zone for the cells under investigation extended a distance of slightly less than about five millimeters from the membrane and that in order to achieve a significantly increased geoelectric effect of at least about one-half of the maximum possible $\Delta E'$, it was necessary to place the electrode within about four millimeters of the membrane or about four-fifths of the thickness of the diffusion zone. Therefore, in order to realize a substantial benefit from the instant invention, the electrode in the dilute solution should be spaced from the membrane not more than four-fifths of the thickness of the concentrated diffusion zone. In the preferred form of the invention, the electrode in the dilute solution is spaced from the membrane a distance of not more than three-fifths, and more preferably not more than two-fifths, of the thickness of the concentrated diffusion zone.

The results illustrated in FIGURE 5 are exclusive in the sense that they are representative only of cells of the particular type under investigation. For other cells, different results will obtain although the $\Delta E'$ versus time curves will be similar in shape to curve 78. For example, for a cell having 1.0 normal and 0.001 normal sodium chloride solutions the concentrated diffusion zone would be wider than that illustrated in FIGURE 5 and for a cell having 0.1 normal and 0.01 normal sodium chloride solutions the concentrated diffusion zone would be thinner. In theory, it would be possible to construct a cell in which the diffusion zone extends only a short distance, e.g., on the order of one or two millimeters or less, from the membrane. However, as a practical matter, concentration cells will seldom if ever produce a concentrated diffusion zone thinner than three millimeters. Therefore, at least some advantage may be realized in accordance with the instant invention by spacing the electrode in the dilute solution at a distance not greater than three millimeters from the membrane.

The electrode should not be in contact with the membrane, and as is apparent from FIGURE 5, only a slight increase in $\Delta E'$ is obtained by positioning the electrode at distances less than one millimeter from the membrane. As a practical matter, therefore, and in order to insure that it does not touch the membrane, the electrode should be positioned not closer than one-half millimeter, and preferably not closer than one millimeter, to the membrane.

Figure 6:
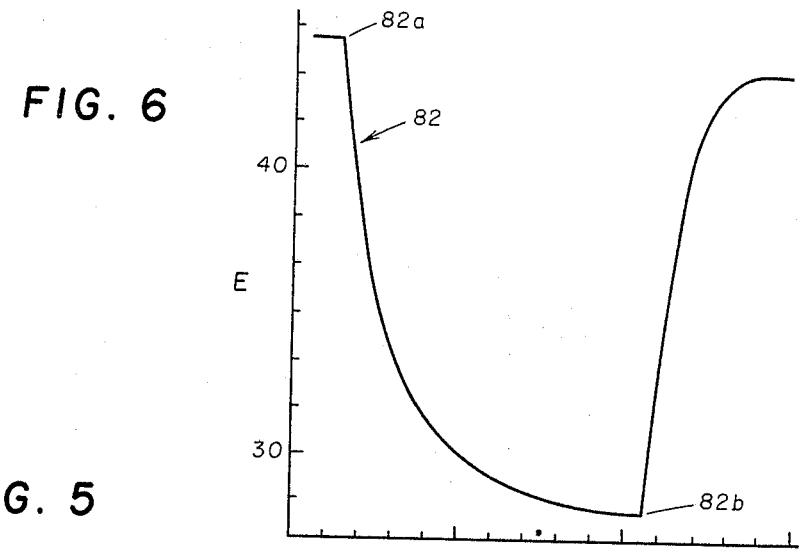
FIGURE 6 is a graph illustrating the geoelectric effect obtained by positioning an electrode within the concentrated diffusion zone of a cell having an inert membrane.

As described in the aforementioned application Ser. No. 501,626, a concentration cell having an inert membrane does not exhibit a geoelectric effect when the electrodes are randomly located at remote positions with respect to the membrane. However, with the electrode in the dilute solution located within the concentrated diffusion zone in accordance with the instant invention, a geoelectric effect may be obtained even though the cell membrane is not ion-selective. In this regard, reference is made to FIGURE 6 which shows the results of a typical test carried out with a cell having the above-described cellophane membrane and in which the electrode in the dilute solution was spaced a distance of 0.8 millimeter from the membrane. Curve 82 of FIGURE 6 is a plot of the cell potential, E, in millivolts on the ordinate versus time, T, in minutes on the abscissa. At point 82a of curve 82, the cell was turned to a position with its membrane in a horizontal plane and at point 82b the cell was returned to its original position with the membrane in a vertical plane. As shown in FIGURE 6, the potential difference across the cell electrodes decreased rapidly in response to the gravitational force normal to the membrane and then increased when the membrane was turned back to a plane parallel to the gravitational force.

For a cell having an inert membrane, the deviation in cell potential in response to an acceleration change on the system is less than the deviation in cell potential for a cell having an ion-selective membrane of similar diffusion characteristics. Therefore, in the preferred form of the invention, the membrane is ion-selective.

In experiments relating to this invention, the geoelectric effect appeared only with cells having solutions of different densities and only when the cell was oriented with the more dense solution below the less dense solution. Therefore, in utilizing systems embodying the instant invention, the primary cell or cells should be oriented with the more dense solution in the direction relative to the less dense solution of the gravitational or other accelerational field to be measured. The more dense solution normally will be the solution of greater concentration. However, this situation may be reversed, for example, by the use of density moderators, so that the concentrated solution has a density less than the dilute solution. This usually will not be preferred since such a cell normally will exhibit a relatively short life and because of other practical complications.

Theoretically, the electrolytic solutions may be of any concentration so long as the concentration of one is different from the concentration of the other. However, certain practical limitations should be considered. Cells having solutions of relatively high concentration differentials tend to yield a greater sensitivity than those having solutions of lower concentration differentials. However, increasing the concentration differential of a cell also tends to increase the potential decay rate. Also, a decrease in the concentrations of the electrolytic solutions is accompanied by a decrease in sensitivity of the potential measuring means due to the relatively high resistances in solutions of lower concentrations. The optimum ratio of the concentrations of the dilute solution to that of the concentrated solution to achieve a suitable balance between potential decay rate and sensitivity is within the range of about 0.03 to 0.003. It is preferred to utilize in the instant invention cells in which the concentrated solution has a normality of about $0.1 \pm 0.05$ and the dilute solution a normality of about $0.001 \pm 0.0005$.

The proximate electrode located within the concentrated diffusion zone in accodance with the present invention must be reversible with respect to ions in the electrolytic solutions. The electrode in the more concentrated solution may be nonreversible, but it is preferred to utilize a reversible electrode here also since a nonreversible electrode will tend to yield a highly unstable and unpredictable cell potential. While in the above-described experimental procedures, the electrodes used were reversible to the anions, i.e., chloride ions, in solution, electrodes reversible to the cations in solution may be employed in practicing the present invention. In this case, the polarity of the cell electrodes will be reversed. That is, the electrode in the more concentrated solution will be the anode and the electrode in the dilute solution the cathode. In most cases, it will be preferred to utilize anion-reversible electrodes in systems embodying the instant invention since the use of cation-reversible electrodes would introduce serious practical complications.

The ion-selective membrane utilized in the instant invention may be either cationic or anionic, but preferably it will be selective of the ion with respect to which the electrodes are not reversible. That is, in a cell having anion-reversible electrodes, as in the preferred form of the invention, a cationic ion-selective membrane should be used. For an anionic membrane in this instance, i.e., with anion-reversible electrodes, the geoelectric effect would be less than the geoelectric effect for a cationic ion-selective membrane and in most, if not all, instances less than the geoelectric effect obtained with remotely positioned electrodes. In a cell having cation-reversible electrodes, an anionic ion-selective membrane should be used. The geoelectric effect in this case will appear as a decrease in cell potential similarly as shown in FIGURE 4.

Concentration cells utilized in the instant invention may comprise solutions of different electrolytes so long as each electrolyte comprises an ion with respect to which the proximate electrode is reversible. For example, with silver, silver chloride electrodes, a solution of sodium chloride may be utilized in one compartment and a solution of potassium chloride in the other. In some instances such cells may be more sensitive than cells using the same electrolyte. However, it is believed that any advantages gained by such increased sensitivity would in most cases be more than offset by difficulties involved in cell operation and interpretation of results and its is preferred to utilize cells having the same electrolyte in both compartments. Having described specific embodiments of the instant invention, it will be understood that further modifications thereof may be suggested to those skilled in the art, and it is intended to cover all such modifications as fall within the scope of the appended claims.

What is claimed is:

1. In an acceleration responsive measuring system:
  a concentration cell divided into first and second compartments by a semipermeable membrane and having in each of said first and second compartments, respectively, first and second electrolytic solutions of different concentrations and densities, said first solution being more concentrated than said second solution and, when said cell is oriented with the membrane in a horizontal plane, tending to diffuse through said membrane to form a concentrated diffusion layer in a zone adjacent said membrane,
  a first electrode in said first compartment,
  a second electrode in said second compartment, said second electrode being reversible with respect to an ion in each of said electrolytic solutions and being spaced from said membrane at a position within the concentrated diffusion zone within said second compartment, and
  an electrical circuit connecting to said first and second electrodes, said circuit including means for measuring a component of the potential difference across said electrodes.

2. The system of claim 1 wherein said first and second electrodes are reversible with respect to an anion in each of said electrolytic solutions.

3. The system of claim 1 wherein said membrane is an ion-selective membrane.

4. The system of claim 3 wherein said first and second electrodes are reversible with respect to an ion in each of said electrolytic solutions of which said membrane is not selective.

5. The system of claim 1 wherein said membrane is a cationic ion-selective membrane and said first and second electrodes are reversible with respect to an anion in each of said electrolytic solutions.

6. The system of claim 5 wherein said second electrode is spaced from said membrane by a distance not greater than four-fifths of the thickness of said concentrated diffusion zone.

7. The system of claim 5 wherein said second electrode is spaced from said membrane by a distance not greater than three-fifths of the thickness of said concentrated diffusion zone.

8. The system of claim 5 wherein said second electrode is spaced from said membrane by a distance not greater than two-fifths of the thickness of said concentrated diffusion zone.

9. The system of claim 5 wherein said second electrode is spaced from said membrane by a distance in the range of one to three millimeters.

10. In an acceleration responsive measuring system:
  a plurality of concentration cells, each divided into first and second compartments by a semipermeable membrane and having in each of said first and second compartments, respectively, first and second electrolytic solutions of different concentrations and densities, said first solution being more concentrated than said second solution and, when said each of said cells is oriented with the membrane in a horizontal plane, tending to diffuse through said membrane to form a concentrated diffusion layer in a zone adjacent said membrane,
  a first electrode in each of said cells in said first compartment,
  a second electrode in each of said cells in said second compartment, said second electrode being reversible with respect to an ion in each of said first and second electrolytic solutions in said each of said cells and being spaced from said membrane at a position within the concentrated diffusion zone within said second compartment, and
  an electrical circuit connecting said cells in series with the first electrode of each of said cells being connected to the second electrode of another of said cells whereby said cells produce potentials of the same polarity, said circuit including means for measuring a component of the cumulative total potential produced by said cells.

11. The system of claim 10 wherein said first and second electrodes in said each of said cells are reversible with respect to an anion in each of said first and second electrolytic solutions in said each of said cells.

12. The system of claim 10 wherein the membrane in said each of said cells is an ion-selective membrane.

13. The system of claim 12 wherein said first and second electrodes in said each of said cells are reversible with respect to an ion in each of said first and second electrolytic solutions in said each of said cells of which said membrane is not selective.

14. The system of claim 10 wherein the membrane in said each of said cells is a cationic ion-selective membrane and said first and second electrodes in said each of said cells are reversible with respect to an anion in each of said first and second electrolytic solutions in said each of said cells.

15. The system of claim 14 wherein said second electrode is spaced from said membrane by a distance not greater than three-fifths of the thickness of said concentrated diffusion zone.

16. The system of claim 14 wherein said second electrode is spaced from said membrane by a distance not greater than two-fifths of the thickness of said concentrated diffusion zone.

17. In an acceleration responsive system:
  a concentration cell divided into first and second compartments by a semipermeable membrane and having in each of said first and second compartments, respectively, first and second electrolytic solutions having a common anion and of different concentrations and densities, said first solution being more concentrated than said second solution and, when said cell is oriented with the membrane in a horizontal plane, tending to diffuse through said membrane to form a concentrated diffusion layer in a zone adjacent said membrane,
  a first electrode in said first compartment, said first electrode being reversible with respect to said common anion,
  a second electrode in said second compartment, said second electrode being reversible with respect to said common anion and being spaced from said membrane at a position within the concentrated diffusion zone within said second compartment, and
  an electrical circuit connecting said first and second electrodes.

18. The system of claim 17 wherein said membrane is a cationic ion-selective membrane and said electrolytic solutions are solutions of the same electrolyte.

19. The system of claim 18 wherein said second electrode is spaced from said membrane by a distance not greater than three-fifths of the thickness of said concentrated diffusion zone.

20. The system of claim 18 wherein said second electrode is spaced from said membrane by a distance not greater than two-fifths of the thickness of said concentrated diffusion zone.

References Cited

UNITED STATES PATENTS

| 2,661,430 | 12/1953 | Hardway | 310—2 |
| 2,896,095 | 7/1959 | Reed et al. | 73—398 |
| 3,056,908 | 10/1962 | Estes et al. | 310—2 |
| 3,065,365 | 11/1962 | Hurd et al. | 310—2 |
| 3,302,091 | 1/1967 | Henderson | 324—94 |

OTHER REFERENCES

"Observations of the Geoelectric Effect in Electrochemical Concentration Cells Using Ion-Exchange Membranes," by Custard et al. Encyclopedia of Chemical Technology, by Kirk-Othmer, vol. 5, pp. 501–503.

JAMES J. GILL, Primary Examiner

ROBERT S. SALZMAN, Assistant Examiner

U.S. Cl. X.R.

73—382; 310—2